(12) United States Patent
Mao et al.

(10) Patent No.: US 9,386,623 B2
(45) Date of Patent: Jul. 5, 2016

(54) METHOD AND APPARATUS FOR MAINTAINING PRIORITY AND QUALITY OF SERVICE ACROSS MULTI-USER DEVICES

(71) Applicant: MOTOROLA SOLUTIONS, INC, Schaumburg, IL (US)

(72) Inventors: Wei Mao, Palatine, IL (US); Trent J Miller, West Chicago, IL (US); Francesca Schuler, Palatine, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/704,252

(22) Filed: May 5, 2015

(65) Prior Publication Data
US 2015/0237670 A1    Aug. 20, 2015

Related U.S. Application Data

(62) Division of application No. 13/930,665, filed on Jun. 28, 2013, now Pat. No. 9,037,145.

(51) Int. Cl.
*H04W 72/00* (2009.01)
*H04W 76/04* (2009.01)
*H04W 4/22* (2009.01)
(Continued)

(52) U.S. Cl.
CPC ............... *H04W 76/04* (2013.01); *H04W 4/22* (2013.01); *H04W 76/007* (2013.01); *H04W 88/04* (2013.01)

(58) Field of Classification Search
CPC ..... H04L 67/28; H04L 67/2823; H04L 67/16; H04L 69/08; H04L 65/105; H04W 4/08; H04W 88/04; H04W 88/182; H04W 8/005; H04W 92/18; H04W 48/18; H04W 80/04; H04W 80/045; H04W 84/18
USPC ...... 455/422.1, 450–455, 464, 509; 370/328–337, 339, 341–348, 431–463, 370/395.5–395.72, 465–469
See application file for complete search history.

(56) References Cited

U.S. PATENT DOCUMENTS 7,184,790 B2    2/2007  Dorenbosch et al.
7,733,885 B2 *  6/2010  Ayyagari ............... H04L 29/06
                                                     370/255
(Continued)

FOREIGN PATENT DOCUMENTS

WO    2010077391 A1    7/2010

OTHER PUBLICATIONS

Corresponding PCT2014/043097—PCT Form—PCT/ISA/206 mailed Sep. 2014 with Annex headed ,"Communication Relating to the Result of the Partial International Search".

(Continued)

*Primary Examiner* — Ronald Eisner

(57) ABSTRACT

A first mobile station operating on a first network according to a first network protocol receives a proxy request for access to a network resource, by from a second mobile station operating on a second network according to a second network protocol. The proxy request is received according to a third network protocol. The first mobile station determines a priority of the proxy request; accepts or denies the proxy request based on the determined priority of the proxy request; allocates resources to the proxy request, if the proxy request is accepted; and serves as a proxy mobile station for the second mobile station to access the network resource.

15 Claims, 7 Drawing Sheets

(51) Int. Cl.
*H04W 88/04* (2009.01)
*H04W 76/00* (2009.01)

(56) References Cited

U.S. PATENT DOCUMENTS

| | | |
|---|---|---|
| 8,130,783 B2 | 3/2012 | Lee et al. |
| 8,165,077 B2 | 4/2012 | Reddy |
| 2003/0068975 A1 | 4/2003 | Qiao et al. |
| 2010/0304674 A1 | 12/2010 | Kim et al. |
| 2010/0322136 A1 | 12/2010 | Kanazawa et al. |
| 2011/0237287 A1 | 9/2011 | Klein et al. |
| 2012/0173901 A1* | 7/2012 | Soliman ............... H04W 88/182 713/320 |
| 2012/0196561 A1 | 8/2012 | Yu et al. |
| 2013/0017802 A1 | 1/2013 | Adibi et al. |

OTHER PUBLICATIONS

Janefalkar A.A. et al: "Cellular Ad-Hoc Relay for Emergencies (CARE)"—IEEE 60th Vehicular Technology Conference, vol. 4, Sep. 2004, pp. 2873-2877, XP010787179.

\* cited by examiner

METHOD AND APPARATUS FOR MAINTAINING PRIORITY AND QUALITY OF SERVICE ACROSS MULTI-USER DEVICES

CROSS-REFERENCE TO RELATED APPLICATION

The present application is a divisional application of, and claims priority to, U.S. patent application Ser. No. 13/930,665, filed in the United States Patent Office on Jun. 28, 2013, the entire contents of which are incorporated herein by reference.

FIELD OF THE DISCLOSURE

The present disclosure relates generally to enabling a mobile station operating according a first wireless access technology to maintain priority and quality of service for certain application services via a proxy mobile station operating according to a second wireless access technology when a connection between the mobile station and a network operating according to the first wireless access technology is compromised.

BACKGROUND

Narrowband communications systems are typically used by public safety agencies, for example, emergency first responder organizations, such as police or fire departments, or public works organizations. Examples of such narrowband systems include a Land Mobile Radio (LMR) system or a Terrestrial Trunked Radio (TETRA) system. Users on these narrowband systems may communicate via mobile or portable user terminals, such as portable narrowband two-way radios, mobile radios, dispatch consoles, or other similar voice communication entities that communicate with one another via wired and/or wireless networks. Public safety organizations may choose these narrowband systems because they provide improved end-to-end voice quality and efficient group communication, use advanced cryptography, enable centralized logging of calls, and/or are associated with lower delay and higher reliability.

A portion of the broadband spectrum, e.g., the 700 MHz spectrum in the United States, has been allocated for public safety use. All public safety agencies and all applications used by these public safety agencies are expected to share this portion of the broadband spectrum. Therefore, in addition to using narrowband systems, public safety agencies may also communicate on cellular broadband systems. An example of such a broadband system is one that operates in accordance with the Long Term Evolution (LTE) signaling standard. Broadband mobile devices used in broadband systems may be, for example, laptops, tablets, personal digital assistants (PDA), smart phones, or other similar broadband mobile devices that communicate with one another via wired and/or wireless networks. In addition to public safety users, user equipment operated by secondary users (for example, utility or government workers) and/or commercial users may also share the portion of the broadband spectrum that has been allocated for public safety use.

Broadband mobile devices may be connected to network resources that are dedicated to certain application services. For example, the broadband mobile devices may also be connected, via a broadband radio access network, to a broadband push-to-talk server or gateway that is dedicated to providing resources for push-to-talk operations. Narrowband mobile or portable user terminals operating on, for example, an LMR system may also be connected to the broadband push-to-talk server or gateway via the LMR system. This allows the broadband mobile devices and the narrowband mobile or portable user terminals to use the same dedicated resources associated with a given application service.

Because of all of the groups of users that are allowed to operate on the portion of the broadband spectrum that has been allocated for public safety, this portion of the broadband spectrum may become congested or coverage to a given broadband network may be lost when, for example, an incident occurs within a geographical area. Incidents may include, for example, a fire, a terrorist attack or another emergency. Consider an example where a large scale attack is carried out within a geographical area. In addition to broadband mobile devices being used by public safety agencies within the vicinity of the incident, user equipment operated by secondary users and/or commercial users are likely to try to access the portion of the broadband spectrum that has been allocated for public safety use. This is likely to lead to congestion on broadband networks operating within that spectrum or loss of access to the broadband networks for some or all of the broadband mobile devices in the geographical area, including those used by public safety agencies. When a broadband mobile device is out of a broadband coverage area or detects that an associated broadband network is congested, the broadband mobile device may either drop all voice and/or data services or provide poor quality of service. For example, if the broadband mobile device is associated with a congested broadband network, information sent from and/or received by the broadband mobile device may have longer delays or poor audio quality.

In addition to the broadband mobile devices operating within the vicinity of an incident, there are likely to be narrowband mobile or portable user terminals operating within the vicinity. Each of the broadband mobile devices and the mobile or portable user terminals (collectively referred to as mobile stations) may include one or more local area network or personal area network transceivers, such as, a Wi-Fi transceiver or a Bluetooth transceiver for device to device communications. Therefore, the mobile stations may further be configured to form an ad-hoc network. An "ad-hoc network" refers to a self-configuring network of geographically-distributed mobile stations connected by wireless links (e.g., radio frequency communication channels). The ad-hoc networks could be built based on a wide band protocol, such as Wi-Fi, Bluetooth, or Zigbee. This enables mobile stations in an ad-hoc network to communicate with each other without the support of an infrastructure-based network. Therefore, even when the broadband mobile devices lose broadband access, these broadband mobile devices can still communicate with other mobile stations in the ad-hoc network. However, these broadband mobile devices may be unable to use the ad-hoc network to access certain network resources and thus be unable to maintain or provide quality of service for certain application services.

Accordingly, there is a need for an improved method and apparatus for enabling a mobile station operating according a first wireless access technology to maintain priority and quality of service for certain application services via a proxy mobile station operating according to a second wireless access technology when a connection between the mobile station and a network operating according to the first wireless access technology is compromised.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
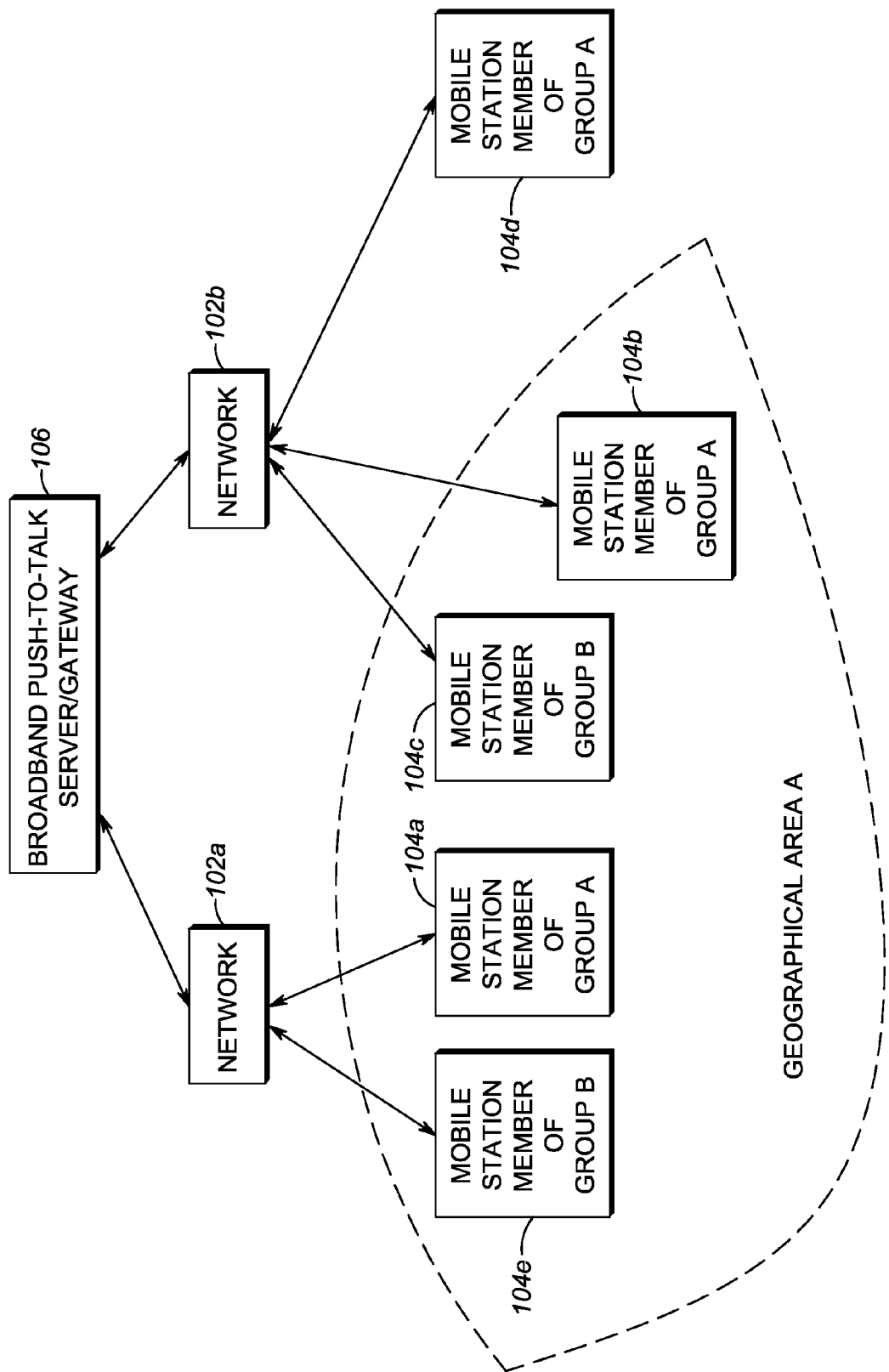
FIG. 1 is a block diagram of a system that may be used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for selecting a proxy mobile station. A first mobile station operating on a first network according to a first network protocol determines that access to a network resource on the first network is unavailable or reduced. The first mobile station communicates, using a third network protocol, with at least one second mobile station within a geographical area. The at least one second mobile station operates on a second network according to a second network protocol. The first mobile station examines information received from each of the second mobile stations in the geographical vicinity and selects one second mobile station as a proxy mobile station based on the examined information. The first mobile station sends a proxy request to the proxy mobile station using the third network protocol and accesses the network resource via the proxy mobile station using the third network protocol.

Other embodiments are methods and apparatuses for serving as a proxy mobile station. A first mobile station operating on a first network according to a first network protocol receives a proxy request for access to a network resource, by from a second mobile station operating on a second network according to a second network protocol. The proxy request is received according to a third network protocol. The first mobile station determines a priority of the proxy request; accepts or denies the proxy request based on the determined priority of the proxy request; allocates resources to the proxy request, if the proxy request is accepted; and serves as a proxy mobile station for the second mobile station to access the network resource.

FIG. 1 is a block diagram of a system that may be used in accordance with some embodiments. System 100 includes at least two networks 102 (i.e., a first network shown as 102a and a second network shown 102b), each of which may operate according to a unique or different wireless access network (WAN) technology from that being used by the other network. For example, network 102a may operate according to a first network protocol and network 102b may operate according to a second network protocol. Non-limiting examples of WAN technologies or WAN network protocols that may be used by each network 102 may include the Land Mobile Radio (LMR) Project 25 (P25) protocol, LMR conventional protocol, Long Term Evolution (LTE) protocol, Code Division Multiple Access (CDMA) protocol, Universal Mobile Telecommunication System (UMTS), or any IEEE 802.11 protocol. For example, network 102a may be a broadband radio access network (RAN) that operates in accordance with the LTE signaling standard and connects core network components (not shown) and broadband mobile devices, shown as the mobile station 104a and 104e. The broadband mobile devices may be, for example, laptops, tablets, personal digital assistants (PDA), smart phones, or other similar broadband mobile devices that communicate with one another via wired and/or wireless networks. The broadband mobile devices may be configured to operate on the portion of the broadband spectrum allocated for public safety use.

Network 102b may be, for example, a narrowband LMR system that is used by public safety agencies, for example, emergency first responder organizations, such as police or fire departments, or public works organizations. Network 102b allows for connectivity between network components (not shown) and narrowband devices shown as mobile stations 104b, 104c and 104d. (Collectively, mobile stations 104a-104e may be referred to herein as mobile stations 104.) The narrowband devices may be, for example, portable narrowband two-way radios, mobile radios, dispatch consoles, or other similar voice communication entities that communicate with one another via wired and/or wireless networks.

Mobile stations 104 may be connected to network resources that are dedicated to certain application services. Non-limiting examples of network resources that mobile stations 104 may be connected to include network resources dedicated to push-to-talk operations, telephony, Voice over LTE (VoLTE), IP Multimedia Subsystem (IMS) services, video, text/multimedia messaging, streaming applications, social network data, presence, location, status, data applications, web services, Web real time communication (WebRTC), sensor information, analytics information, and/or computer aided dispatch queries. FIG. 1 shows an example where mobile stations 104a and 104e are connected, via the broadband network 102a, to a broadband push-to-talk server/gateway 106 that is dedicated to providing resources for push-to-talk operations. Narrowband mobile stations 104b, 104c and 104d are also connected to the broadband push-to-talk server/gateway 106 via the narrowband network 102b. This allows the broadband mobile devices (i.e., mobile stations 104a and 104e) and the narrowband devices (i.e., mobile stations 104b, 104c and 104d) to use the same dedicated resource for push-to-talk operations. Therefore, FIG. 1 illustrates that two or more of the mobile stations 104 may belong to a same talk group (i.e., Group A or Group B), regardless of the network being used by each mobile station. For example, mobile station 104a is shown to belong to the same talk group (i.e., Group A) as mobile stations 104b and 104d.

Each mobile station 104 may include one or more local area network or personal area network transceivers operating in accordance a third network protocol such as a Wi-Fi transceiver perhaps operating with an IEEE 802.11 standard (e.g., 802.11a, 802.11b, 802.11g), an IEEE 802.15 standard, a 3GPP ProSe standard, a Land Mobile Radio Direct Mode technology, or a Bluetooth transceiver, for mobile station to mobile station communications in, for example, an ad-hoc network. When one or more of mobile stations 104 operates within the same geographical vicinity, the mobile stations operating within the same geographical vicinity may form an ad-hoc network where the mobile stations can communicate with each other over a wireless media without the support of an infrastructure-based or wired network.

When a network (102a or 102b) is disabled or congested, the mobile stations operating on that network may be unable to fully access the network resources and may thus be unable to fully provide those applications services associated with the currently unavailable network resources. For example, when an incident such as a large scale emergency event occurs within geographical area A, one or more of the networks in that geographical vicinity may become congested or disabled. During this period, the mobile stations connected to the congested or disabled network may be unable to fully access network resources on the congested network. Subsequent to detecting the loss or reduction of network access, a mobile station without full network access may be configured to locate other mobile stations operating on other networks within the geographical vicinity via, for example, a Wi-Fi transceiver.

Subsequent to connecting with one or more other mobile stations operating on other networks within the geographical vicinity, via a local area network transceiver, the mobile station without network access is configured to evaluate the information received from each of the one or more other mobile stations in order to select a mobile station that may potentially serve as a proxy for the mobile station without network access. The proxy mobile station will be used to relay voice and/or data messages to and from the mobile station without network access. The mobile station without network access may select a proxy mobile station based on, for example, the run-time attributes of the proxy mobile station; the capabilities of the proxy mobile station; the priority associated with the application(s), the user and/or the incident associated with the proxy mobile station; and/or the priority associated with the application(s), the user and/or the incident associated with the mobile station without network access. Non-limiting examples of the run-time attributes on the proxy mobile station may include the battery life, the WAN signal strength, the WAN technology being used, or the available WAN resource(s) on the proxy mobile station. Non-limiting examples of the capabilities of the proxy mobile station may be the WAN technology, the processing capabilities, and/or available memory and resource(s) on the proxy mobile station.

Consider an example where a mobile station, for example, mobile station 104a, is connected to broadband push-to-talk server/gateway 106 via network 102a. When an incident occurs and the connection between mobile station 104a and network 102a is disabled or the mobile station's network access is reduced, mobile station 104a may communicate, via its Wi-Fi transceiver, with mobile stations 104b and 104c operating on network 102b within the geographical vicinity of the incident, i.e., geographical area A. Mobile station 104a may select one of mobile stations 104b and 104c to act as a proxy mobile station in order for mobile station 104a to continue to send/receive push-to-talk messages. Mobile station 104a may select a proxy mobile station based on, for example, the push-to-talk attributes such as the talk group(s) associated with each of mobile station 104b or 104c or the talk group/channel configured on each of mobile station 104b or 104c. Mobile station 104a may also select the proxy mobile station based on, for example, the data attributes such as the data capability of each of mobile station 104b or 104c or the data application capability (e.g., text and/or multimedia messaging, telephony, video, push-to-talk) configured on each of mobile station 104b or 104c. Mobile station 104a may also select the proxy mobile station based on, for example, user-reachability (e.g., whether each of mobile station 104b or 104c can be reached in one hop or multi-hops) or role-reachability (e.g., whether each of mobile station 104b or 104c has the same security in place to access critical data that can be accessed by mobile station 104a). The priority or role assigned to the user of each of mobile station 104b or 104c may also be a criterion used in selecting the proxy mobile station. The ability on each of mobile station 104b or 104c for mobile station 104a to remotely control the talk group/channel may also be a criterion used in selecting the proxy mobile station. In addition, additional criteria that may be used to select the proxy mobile station includes whether or not each of mobile station 104b or 104c is operating in infrastructure mode or direct mode; the signal attributes such as the received signal strength indicator (RSSI) or bandwidth associated with each of mobile stations 104b or 104c; and the activities (e.g., active talker vs. listener) of the user of each of mobile stations 104b or 104c.

If mobile station 104a selects, for example, mobile station 104b to serve as the proxy mobile station, mobile station 104a performs a handshake with mobile station 104b. For example, mobile station 104a and mobile station 104b may exchange messages that pair the two devices based on an ad-hoc protocol, for example, a Wi-Fi protocol or Bluetooth protocol. Subsequent to successfully completing the handshake, mobile station 104b receives a request to serve as a proxy for one or more application services being executed on mobile station 104a. For example, mobile station 104b may receive a proxy request to serve as a proxy for push-to-talk operations being executed on mobile station 104a.

Mobile station 104b may determine the priority of the proxy request by considering, for example, the type of application service(s) mobile station 104a is requesting access to, the incident type, the group priority, and/or the role of the user associated with mobile station 104a. Mobile station 104b may also determine the priority of existing applications running on mobile station 104b by, for example, taking into consideration the type of application(s) being executed on mobile station 104b, the incident type, the emergency status, the group priority, and/or the role of the user associated with mobile station 104b. If mobile station 104b determines that the priority associated with the mobile station 104a is lower than a predefined threshold and/or the resources and capabilities available on mobile station 104b are insufficient to support the proxy request, mobile station 104b may reject the proxy request.

If, on the other hand, mobile station 104b determines that the priority associated with the mobile station 104a is higher than the predefined threshold and/or the resources and capabilities available on mobile station 104b are sufficient to support the proxy request, mobile station 104b may determine if a preemption feature is enabled on mobile station 104b. If the preemption feature is enabled, mobile station 104b identifies the application service(s) being executed on mobile station 104b and/or mobile station 104a that are assigned a priority lower than a preemption threshold and preempts those applications from being executed. Mobile station 104b may then allocate resources that were being used by the preempted applications for the proxy request and signals to mobile station 104a that mobile station 104b may serve as a proxy for the requested application service(s).

If the preemption feature on mobile station 104b is disabled, mobile station 104b may queue proxy request(s) received from mobile station 104a until resources on mobile station 104b become available. Mobile station 104b may evaluate the priority of the proxy request(s) in order to determine queue locations on mobile station 104b. When resources on mobile station 104b become available, mobile station 104b may allocate those resources for the proxy request(s) and signals to mobile station 104a that mobile station 104b may serve as a proxy for the requested application service(s).

Subsequent to receiving an indication from mobile station 104b that mobile station 104b will serve as a proxy for mobile station 104a, mobile station 104a may begin to use mobile station 104b as a proxy for application services. In some embodiments, the user of mobile station 104b would be assigned a higher priority so that mobile station 104b would only serve as a proxy for mobile station 104a when the user of mobile station 104b is not using the resources on mobile station 104b. In some embodiments, depending on the role/priority assigned to the user of the mobile station 104a, the user of mobile station 104b could interrupt the proxied application services being directed to mobile station 104a.

When a status of mobile station 104b changes, mobile station 104b may send updated information indicating such change to collaborating mobile station 104a at runtime. For example, if the talk group/channel on mobile station 104b is changed or if the radio frequency conditions on mobile station 104b changes, mobile station 104b may send updated information indicating a change in a talk group/channel or in radio frequency conditions to mobile station 104a at runtime. Subsequent to receiving this information, mobile station 104a may dynamically re-select a different mobile station as its proxy.

The proxy mobile station (i.e., mobile station 104b) may be configured to provide information that informs the user of mobile station 104b that it is being used as a proxy. Using an example where mobile station 104b is serving as a proxy for push-to-talk operations, mobile station 104b may be configured to play out or display information associated with the proxied push-to-talk audio. A mobile station 104 may also be configured to serve as a proxy for one or more mobile stations. For example, if multiple mobile stations are seeking a proxy, after a mobile station is selected as the proxy for a first mobile station, if there are still available resources on the proxy mobile station, the same mobile station may serve as a proxy for other mobile stations. In some embodiments, mobile stations seeking a proxy may be allowed to use resources on the proxy mobile station based on, for example, the priority assigned to each mobile station seeking a proxy, the roles of the user of each mobile station seeking a proxy or other information that indicates that one mobile station is to be given a higher priority than another mobile station.

Figure 2:
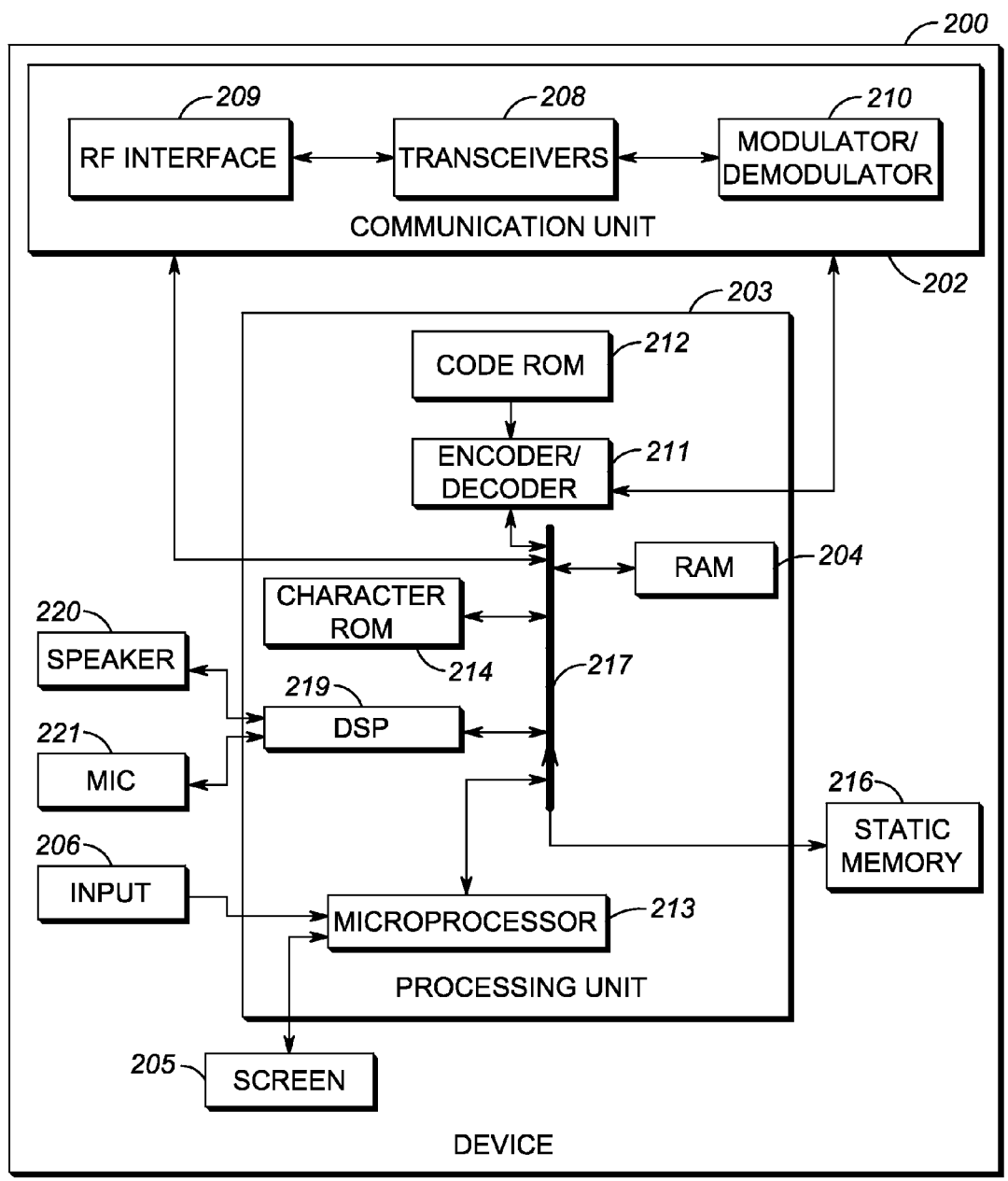
FIG. 2 is a block diagram of a mobile station used in accordance with some embodiments.

FIG. 2 is a block diagram of a mobile station 200, such as mobile stations 104a-104e, used in accordance with some embodiments. The mobile station includes a communications unit 202 coupled to a common data and address bus 217 of a processing unit 203. The mobile station may also include an input unit (e.g., keypad, pointing device, etc.) 206, an output transducer unit (e.g., speaker) 220, an input transducer unit (e.g., a microphone) (MIC) 221, and a display screen 205, each coupled to be in communication with the processing unit 203.

The processing unit 203 may include an encoder/decoder 211 with an associated code ROM 212 for storing data for encoding and decoding voice, data, control, or other signals that may be transmitted or received by the mobile station. The processing unit 203 may further include a microprocessor 213 coupled, by the common data and address bus 217, to the encoder/decoder 211, a character ROM 214, a RAM 204, and a static memory 216. The processing unit 203 may also include a digital signal processor (DSP) 219, coupled to the speaker 220, the microphone 221, and the common data and address bus 217, for operating on audio signals received from one or more of the communications unit 202, the static memory 216, and the microphone 221.

The communications unit 202 may include an RF interface 209 configurable to communicate with network components, and other user equipment within its communication range. The communications unit 202 may include one or more broadband and/or narrowband transceivers 208, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. The communications unit 202 may include one or more local area network or personal area network transceivers such as Wi-Fi transceiver perhaps operating in accordance with an IEEE 802.11 standard (e.g., 802.11a, 802.11b, 802.11g), or a Bluetooth transceiver, for subscriber device to subscriber device communications. The transceivers may be coupled to a combined modulator/demodulator 210 that is coupled to the encoder/decoder 211. The character ROM 214 stores code for decoding or encoding data such as control, request, or instruction messages, channel change messages, and/or data or voice messages that may be transmitted or received by the mobile station. Static memory 216 may store operating code associated with processing a proxy request.

Figure 3A:
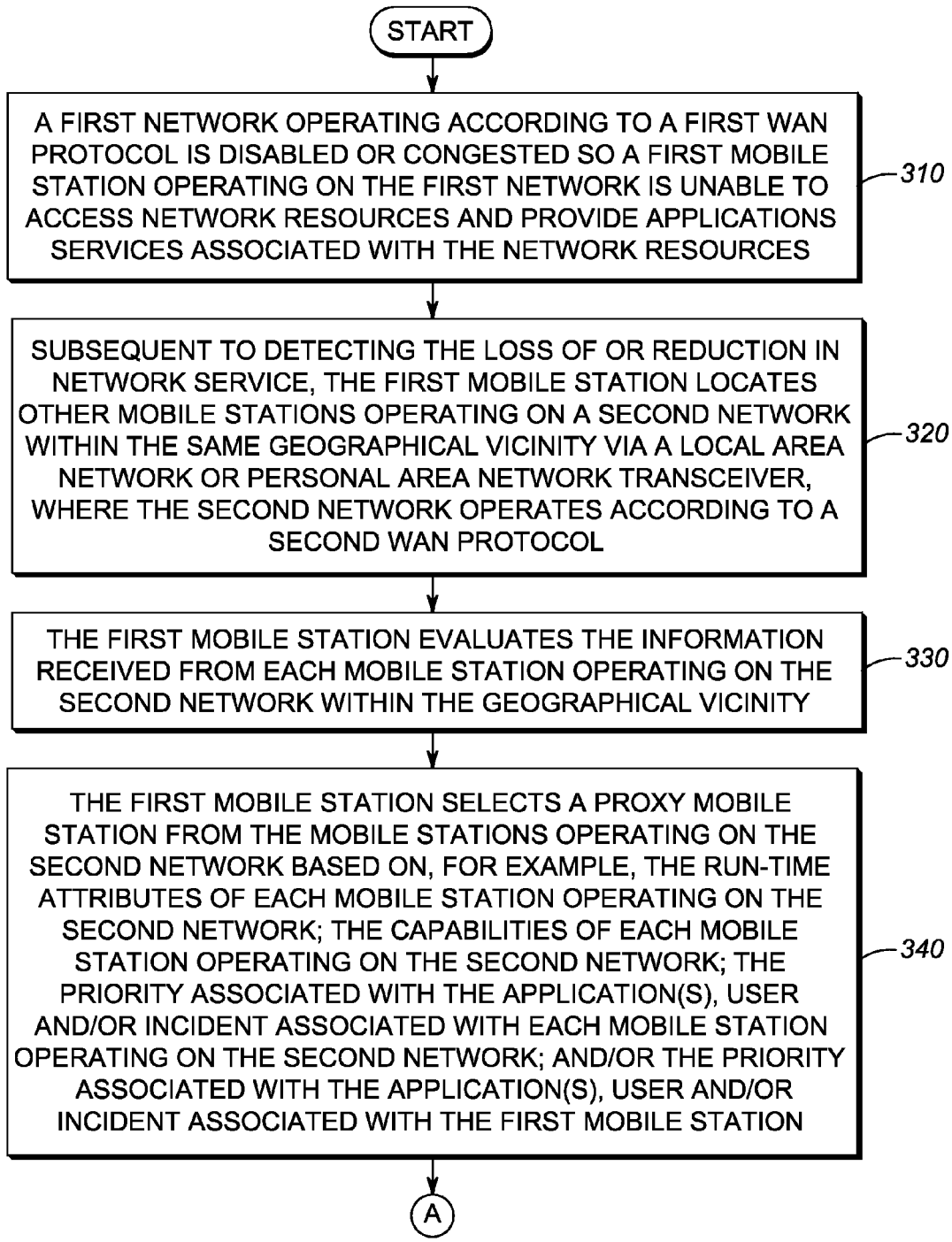
FIG. 3A is a flow diagram of how a proxy mobile station is selected in accordance with some embodiments.
Figure 3B:
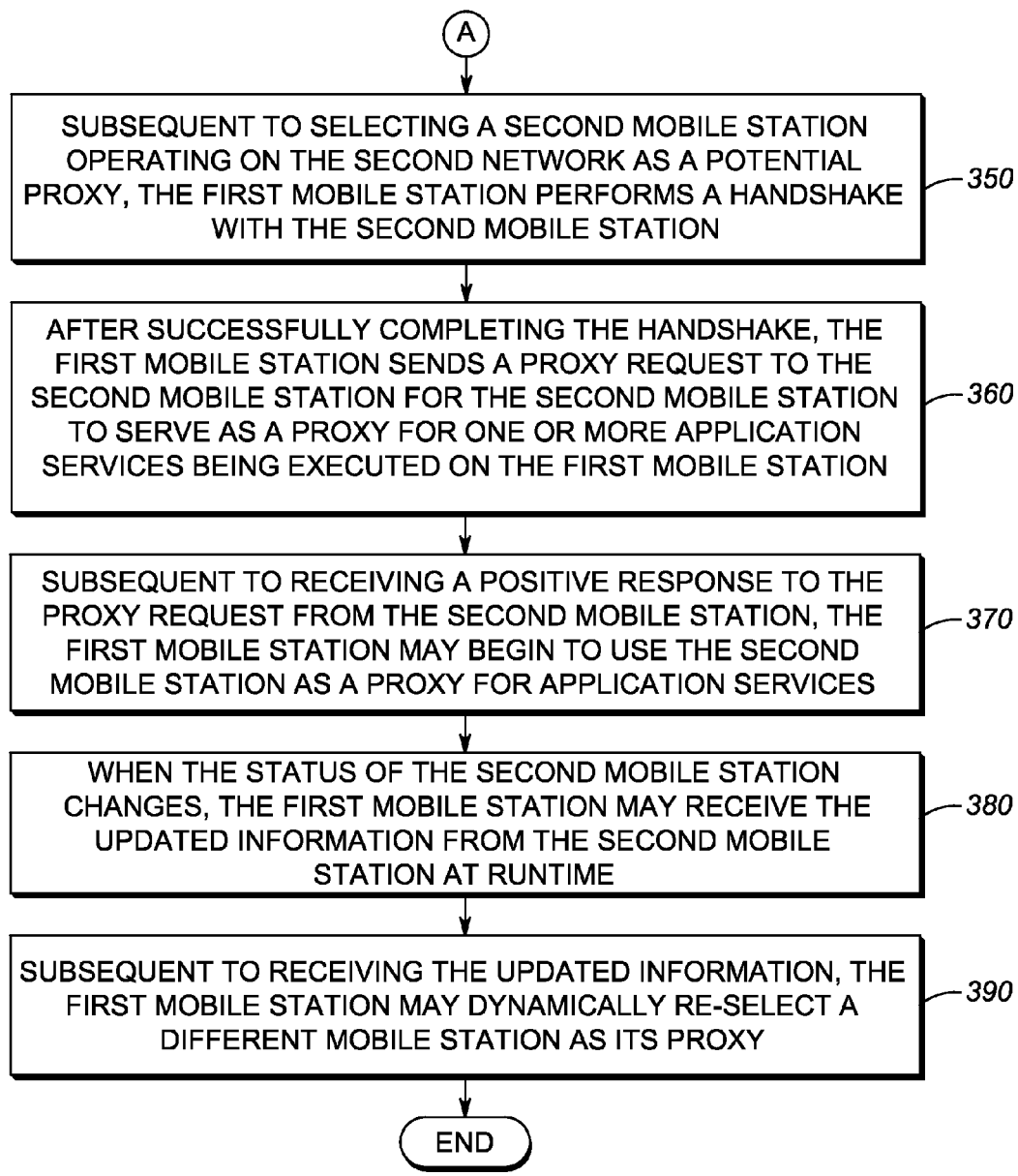
FIG. 3B is a continuation of the flow diagram of FIG. 3A illustrating how a proxy mobile station is selected in accordance with some embodiments.

FIGS. 3A and 3B depict a flow diagram illustrating how a proxy mobile station is selected in accordance with some embodiments. At 310, a first network operating according to a first WAN protocol is disabled or congested so a first mobile station operating on the first network is unable to access network resources and provide applications services associated with the network resources. At 320, subsequent to detecting the loss of or reduction in network service, the first mobile station locates other mobile stations operating on a second network within the same geographical vicinity via a local area network or personal area network transceiver, where the second network operates according to a second, different WAN protocol.

At 330, the first mobile station obtains from, and evaluates, information from one or more mobile stations operating on the second network within the geographical vicinity. At 340, the first mobile station selects a proxy mobile station from the one or more mobile stations operating on the second network based on, for example, the run-time attributes of each mobile station operating on the second network; the capabilities of each mobile station operating on the second network; the priority associated with the application(s), user and/or incident associated with each mobile station operating on the second network; and/or the priority associated with the application(s), user and/or incident associated with the first mobile station. At 350, subsequent to selecting a second mobile station operating on the second network as a potential proxy, the first mobile station performs a handshake with the second mobile station. At 360, after successfully completing the handshake, the first mobile station sends a proxy request to the second mobile station for the second mobile station to serve as a proxy for one or more application services being executed on the first mobile station.

At 370, subsequent to receiving a positive response to the proxy request from the second mobile station, the first mobile station may begin to use the second mobile station as a proxy for application services. At 380, when a status of the second mobile station changes, for example, a change in a talk group/channel or a change in radio frequency conditions associated with the second mobile station, the first mobile station may receive updated information indicating such change from the second mobile station at runtime. At 390, subsequent to receiving the updated information, the first mobile station may dynamically re-select a different mobile station as its proxy.

Figure 4A:
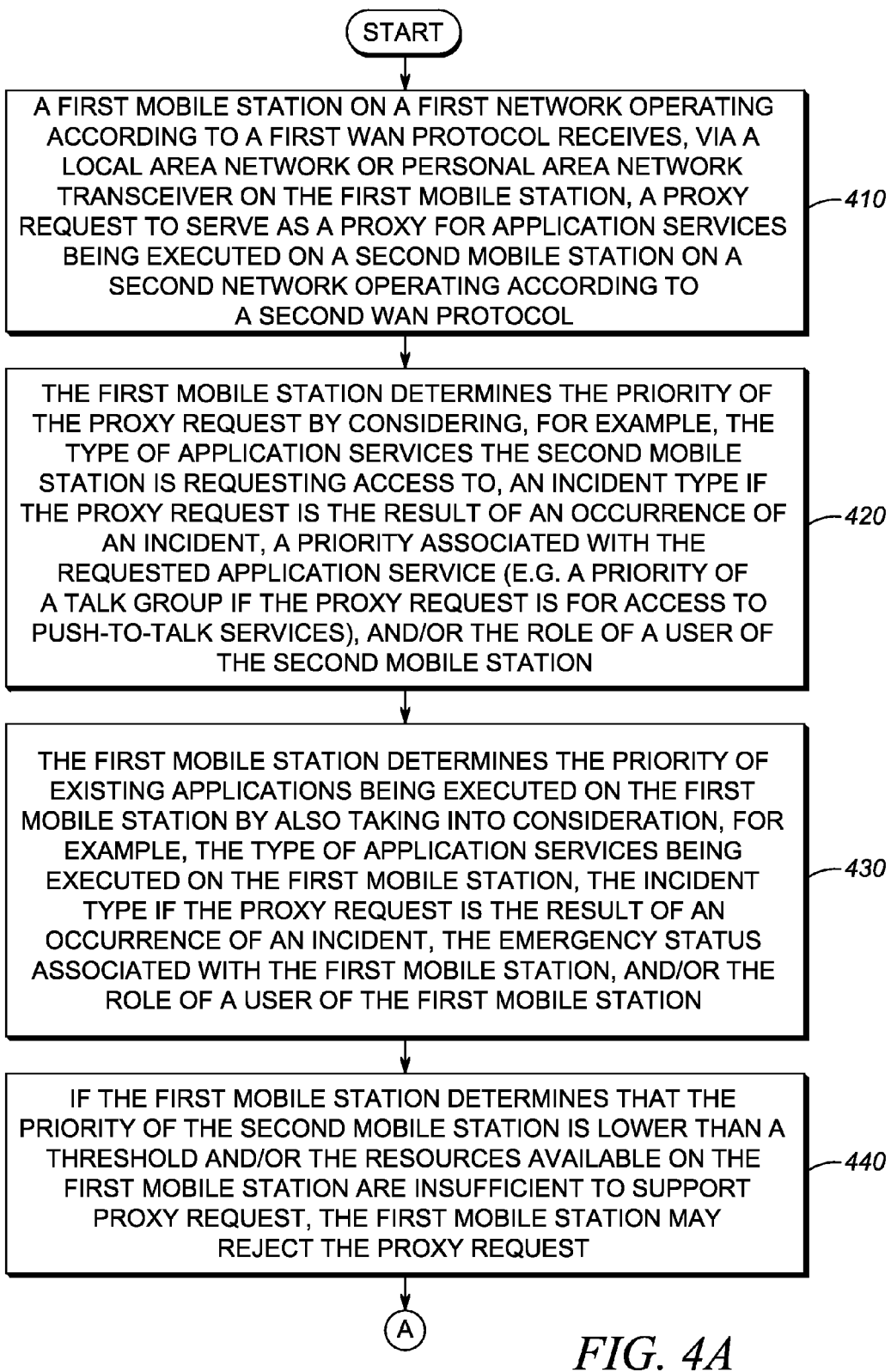
FIG. 4A is a flow diagram of how a proxy mobile station handles a proxy request in accordance with some embodiments.
Figure 4B:
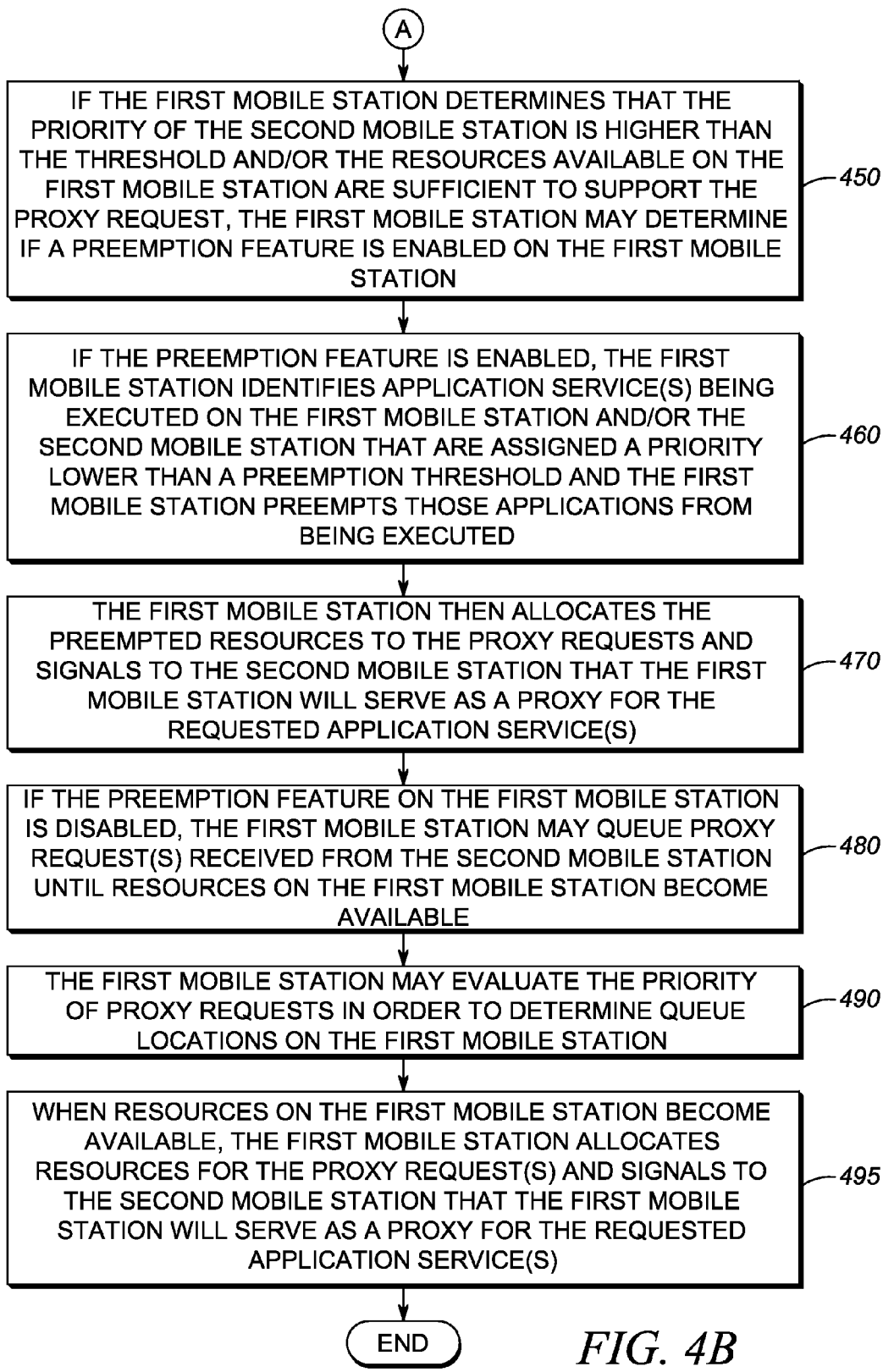
FIG. 4B is a continuation of the flow diagram of FIG. 4A illustrating how a proxy mobile station handles a proxy request in accordance with some embodiments.

FIGS. 4A and 4B depict a flow diagram illustrating how a proxy mobile station handles a proxy request in accordance with some embodiments. At 410, a first mobile station on a first network operating according to a first WAN protocol receives, via a local area network or personal area network transceiver on the first mobile station, a proxy request to serve as a proxy for application services being executed on a second mobile station on a second network operating according to a second, different WAN protocol. At 420, the first mobile station determines a priority of the proxy request by considering, for example, the type of application services the second mobile station is requesting access to, an incident type if the proxy request is the result of an occurrence of an incident, a priority associated with the requested application service (e.g., a priority of a talk group if the proxy request is for access to push-to-talk services), and/or the role of a user of the second mobile station. At 430, the first mobile station determines a priority of existing applications being executed on the first mobile station by also taking into consideration, for example, the type of application services being executed on the first mobile station, the incident type if the proxy request is the result of an occurrence of an incident, the emergency status associated with the first mobile station, and/or the role of a user of the first mobile station.

At 440, if the first mobile station determines that the priority of the second mobile station is lower than a threshold and/or the resources available on the first mobile station are insufficient to support proxy request, the first mobile station may reject the proxy request. At 450, if the first mobile station determines that the priority of the second mobile station is higher than the threshold and/or the resources available on the first mobile station are sufficient to support the proxy request, the first mobile station may determine if a preemption feature is enabled on the first mobile station. At 460, if the preemption feature is enabled, the first mobile station identifies application service(s) being executed on the first mobile station and/or the second mobile station that are assigned a priority lower than a preemption threshold and the first mobile station preempts those applications from being executed. At 470, the first mobile station then allocates the preempted resources to the proxy requests and signals to the second mobile station that the first mobile station will serve as a proxy for the requested application service(s).

At 480, if the preemption feature on the first mobile station is disabled, the first mobile station may queue proxy request(s) received from the second mobile station until resources on the first mobile station become available. At 490, the first mobile station may evaluate the priority of proxy requests in order to determine queue locations on the first mobile station. At 495, when resources on the first mobile station become available, the first mobile station allocates resources for the proxy request(s) and signals to the second mobile station that the first mobile station will serve as a proxy for the requested application service(s).

Figure 5:
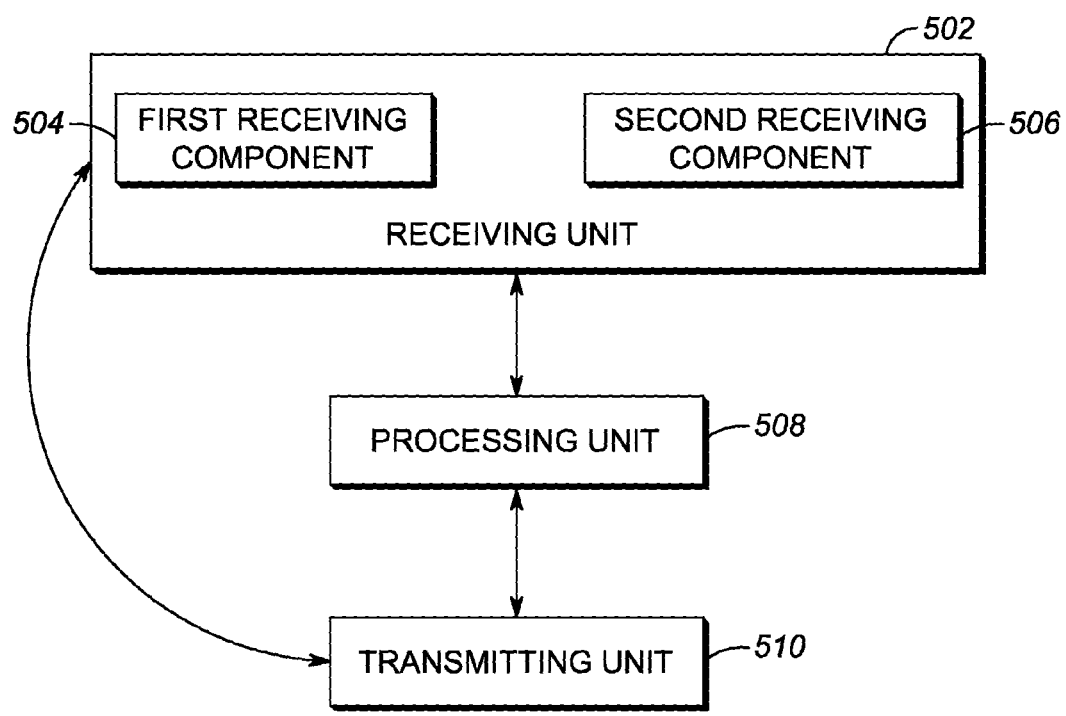
FIG. 5 is a block diagram of a mobile station used in accordance with some embodiments.

FIG. 5 is a block diagram of a mobile station used in accordance with some embodiments. A receiving unit 502 of the mobile station, such as communication unit 202 of mobile station 200, operates on a first network according to a first network protocol and is configured to receive a proxy request for access to a network resource from a second mobile station operating on a second network according to a second network protocol. The proxy request is received according to a third network protocol. Therefore, receiving unit 502, includes a first receiving component 504 configured to receive information sent according to the first network protocol and a second receiving component 506 configured to receive information sent according to the third network protocol. The mobile station further includes a processing unit 508, such as processing unit 203 of mobile station 200, configured to determine a priority of the proxy request, accept or deny the proxy request based on the determined priority of the proxy request, allocate resources to the proxy request, if the proxy request is accepted, and operate the mobile station as a proxy mobile station for the second mobile station to access the network resource. The mobile station further includes a transmitting unit 510, such as communication unit 202 of mobile station 200, configured to send information to and receive information from the second mobile station according to the third network protocol.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 20%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. For example, the mobile stations of FIGS. 1 and/or 2 may comprise a set of instructions (perhaps stored in a volatile or non-volatile computer readable medium) that, when executed by a processor, perform some or all of the steps set forth in FIGS. 3-4 and the corresponding text. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for selecting a proxy mobile station, the method comprising,
   determining, by a first mobile station operating on a first network according to a first network protocol, that access to a network resource on the first network is unavailable or reduced;
   communicating, by the first mobile station using a third network protocol, with a plurality of mobile stations within a predefined range, the plurality of mobile stations operating on a second network according to a second network protocol;
   examining, by the first mobile station, information received from each of the plurality of mobile stations in the predefined range and selecting a mobile station of the plurality of mobile stations as a proxy mobile station based on the examined information; and
   sending, by the first mobile station using the third network protocol, a proxy request to the proxy mobile station, and accessing, using the third network protocol, the network resource via the proxy mobile station.

2. The method of claim 1, wherein the accessing comprises accessing the network resource dedicated to at least one of push-to-talk operations, telephony, Voice over Long Term Evolution (VoLTE), IP Multimedia Subsystem services, video, text or multimedia messaging, streaming applications, social network data, presence, location, status, data applications, web services, Web real time communication, sensor information, analytics information, or computer aided dispatch queries.

3. The method of claim 2, wherein the examining comprises examining at least one of:
   run-time attributes of each of the plurality of mobile stations,
   capabilities of each of the plurality of mobile stations,
   a priority associated with at least one of an application, a user or an incident associated with each of the plurality of mobile stations, or
   a priority associated with at least one of an application, a user or an incident associated with the first mobile station.

4. The method of claim 1, wherein the accessing comprises accessing the network resource via the proxy mobile station subsequent to receiving a positive response to the proxy request from the proxy mobile station.

5. The method of claim 1, further comprising sending, by the first mobile station, a second proxy request to at least one other mobile station subsequent to receiving a status update from the proxy mobile station, using the at least one other mobile station as a new proxy mobile station, and accessing the network resource via the new proxy mobile station.

6. The method of claim 1, wherein a user of the first mobile station is different from a user of each of the plurality of mobile stations.

7. The method of claim 1, wherein one of the first network protocol and the second network protocol is a broadband network protocol and the other network protocol of the first network protocol and the second network protocol is a narrowband network protocol.

8. The method of claim 7, wherein the third network protocol is one of a Wi-Fi protocol, an Institute of Electrical and Electronics Engineers 802.15 protocol, a Third Generation Partnership Project ProSe protocol, a Land Mobile Radio Direct Mode protocol, a Bluetooth protocol, or a Zigbee protocol.

9. A mobile station comprising:
   a communications unit comprising a first transceiver, the first transceiver being configured to communicate over a first network according to a first network protocol, and a second transceiver, the second transceiver being configured to communicate using a third network protocol;

a processing unit; and a memory device that stores operating code that, when executed by the processing unit, causes the processing unit to perform the functions of:

determining that access to a network resource on the first network is unavailable or reduced;

communicating, using the third network protocol, with a plurality of mobile stations within a predefined range, the plurality of mobile stations operating on a second network according to a second network protocol;

examining information received from each of the plurality of mobile stations in the predefined range and selecting a mobile station of the plurality of mobile stations as a proxy mobile station based on the examined information; and sending, using the third network protocol, a proxy request to the proxy mobile station, and accessing, using the third network protocol, the network resource via the proxy mobile station.

10. The mobile station of claim 9, wherein the memory device stores operating code that, when executed by the processing unit, causes the processing unit to access the network resource via the proxy mobile station using the third network protocol by accessing the network resource dedicated to at least one of push-to-talk operations, telephony, Voice over Long Term Evolution (VoLTE), IP Multimedia Subsystem services, video, text or multimedia messaging, streaming applications, social network data, presence, location, status, data applications, web services, Web real time communication, sensor information, analytics information, or computer aided dispatch queries.

11. The mobile station of claim 10, wherein the memory device stores operating code that, when executed by the processing unit, causes the processing unit to examine information received from each of the plurality of mobile stations by examining at least one of:

run-time attributes of each of the plurality of mobile stations, capabilities of each of the plurality of mobile stations, a priority associated with at least one of an application, a user or an incident associated with each of the plurality of mobile stations, or a priority associated with at least one of an application, a user or an incident associated with the first mobile station.

12. The mobile station of claim 9, wherein the memory device stores operating code that, when executed by the processing unit, causes the processing unit to access the network resource via the proxy mobile station subsequent to receiving a positive response to the proxy request from the proxy mobile station.

13. The mobile station of claim 9, wherein the memory device stores operating code that, when executed by the processing unit, causes the processing unit to perform the functions of:

sending a second proxy request to at least one other mobile station subsequent to receiving a status update from the proxy mobile station;

using the at least one other mobile station as a new proxy mobile station; and accessing the network resource via the new proxy mobile station.

14. The mobile station of claim 9, wherein one of the first network protocol and the second network protocol is a broadband network protocol and the other network protocol of the first network protocol and the second network protocol is a narrowband network protocol.

15. The mobile station of claim 14, wherein the third network protocol is one of a Wi-Fi protocol, an Institute of Electrical and Electronics Engineers 802.15 protocol, a Third Generation Partnership Project ProSe protocol, a Land Mobile Radio Direct Mode protocol, a Bluetooth protocol, or a Zigbee protocol.

\* \* \* \* \*